R. LUCY.
QUACK GRASS DIGGER.
APPLICATION FILED OCT. 7, 1921.
1,417,537.
Patented May 30, 1922.
3 SHEETS—SHEET 3.
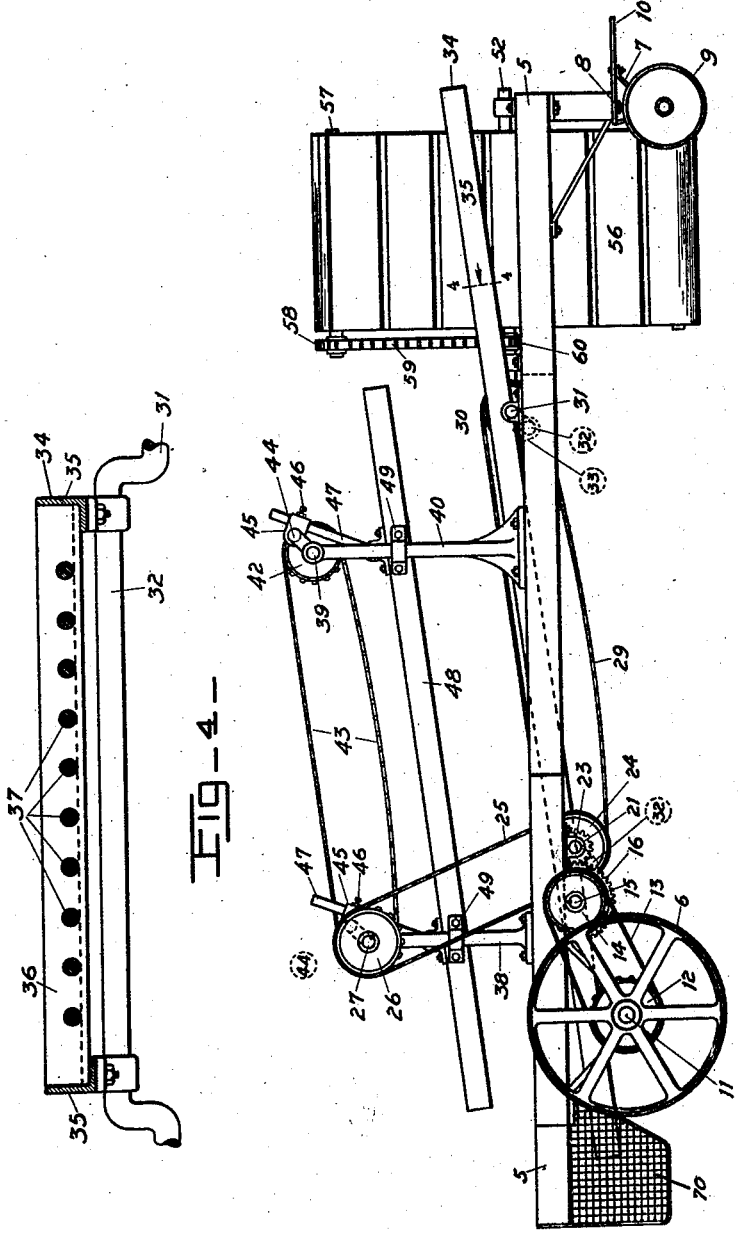
Inventor
ROBERT LUCY
By *A. E. Carlson*
Attorney

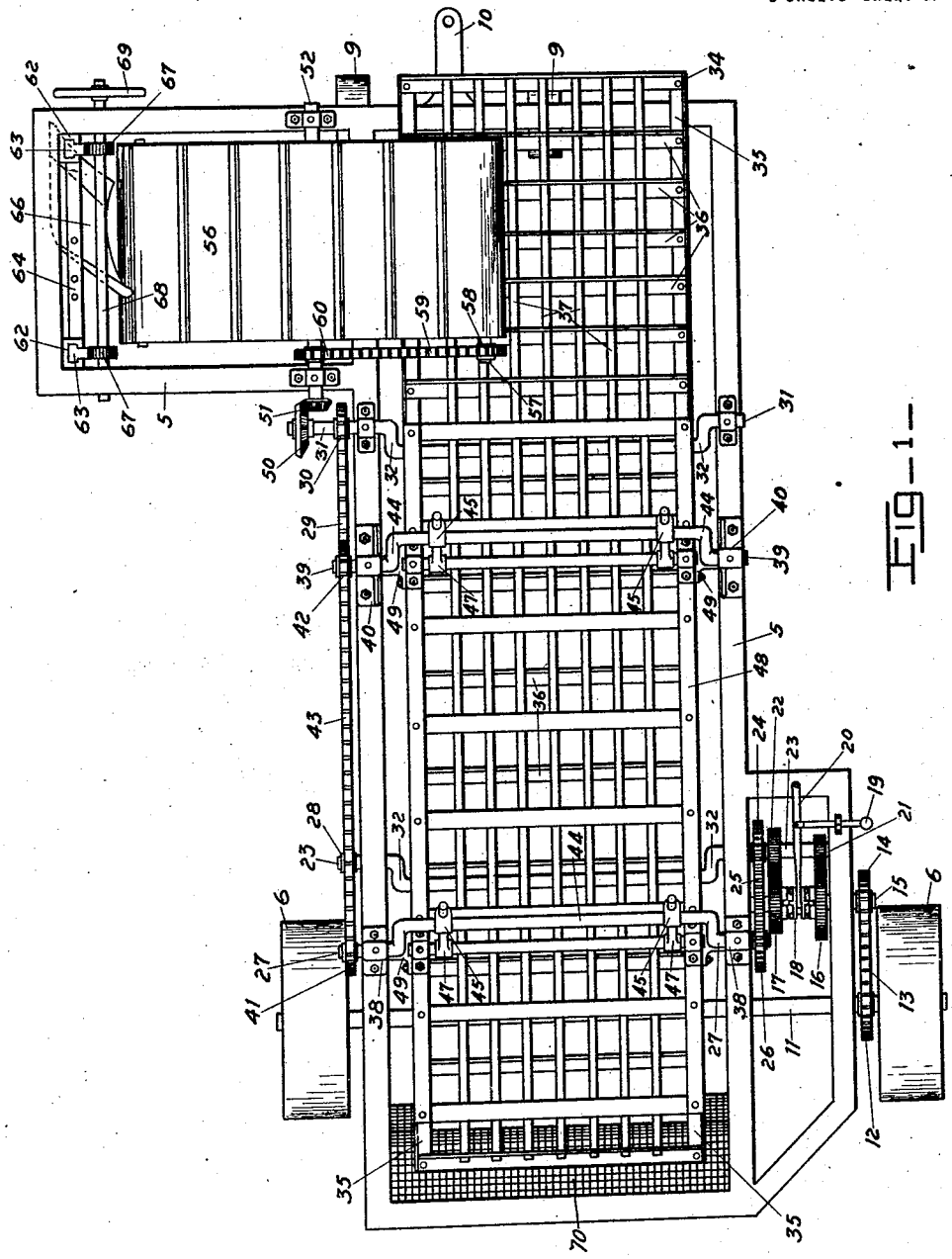

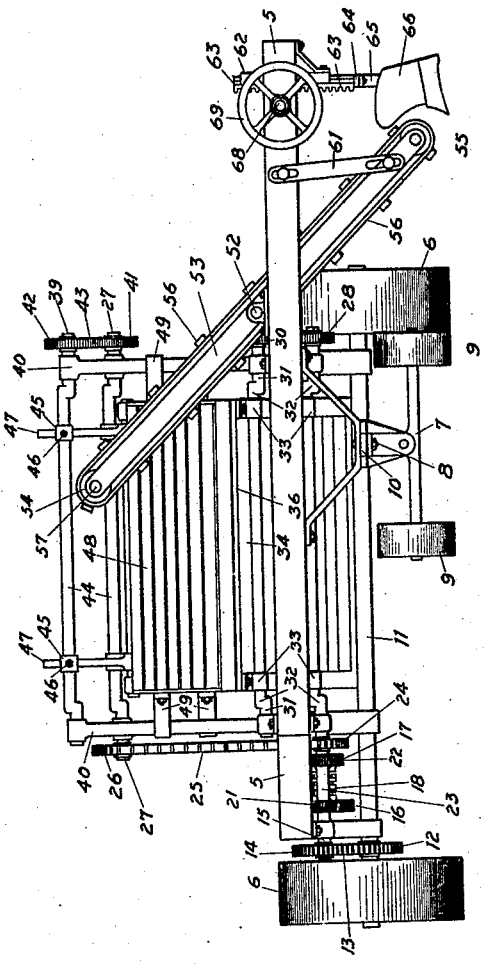

UNITED STATES PATENT OFFICE.

ROBERT LUCY, OF OLGA, NORTH DAKOTA.

QUACK-GRASS DIGGER.

1,417,537.  Specification of Letters Patent.  Patented May 30, 1922.

Application filed October 7, 1921. Serial No. 505,996.

*To all whom it may concern:*

Be it known that I, ROBERT LUCY, a citizen of the United States, residing at Olga, in the county of Cavalier and State of North Dakota, have invented certain new and useful Improvements in Quack-Grass Diggers, of which the following is a specification.

This invention relates to quack grass destroying machines and the main object is to provide an efficient and practical machine for pulverizing the ground surface and eradicating therefrom all weeds and other destructive quack grasses. Further objects will be disclosed in the course of the following specification and in the accompanying drawings, in which:

Figure 1 is a top or plan view of the machine.

Fig. 2 is a front end view of the machine or as seen from the right in Fig. 1.

Fig. 3 is a side elevation of the machine.

Fig. 4 is an enlarged detail sectional view of the lower shaker, as seen on line 4—4 in Fig. 3.

Referring to the drawings by reference numerals, 5 designates a suitable frame, the same being supported on two traction wheels 6 and a front truck 7. The truck 7 is pivotally secured as at 8, and is provided with two small wheels 9 and a short tongue 10 which is adapted to be secured to a tractor or horses, as desired. To the shaft 11 of the wheels 6 is fixed a sprocket gear 12 having a sprocket chain 13 driving a gear 14 fixed on a shaft 15. Two clutch gears 16 and 17 are rotatably mounted on the shaft 15. A grooved clutch member 18 is fixed on the shaft 15 and may be thrown into engagement with either of the gears 16 or 17 by a handle 19 operating a lever (see Fig. 1). Two gears 21 and 22 (sized according to speed required) mesh respectively with the gears 16 and 17, and are fixed on a shaft 23 journaled in the main frame. A sprocket gear 24 near one end of the shaft 23 is connected by a sprocket chain 25 to a sprocket gear 26 on a shaft 27. The other end of the shaft 23 is provided with a sprocket gear 28 which is connected by a chain 29 to a sprocket gear 30 on a shaft 31. The major portions of the shafts 23 and 31 are offset as at 32, both in the same direction, and on these offset portions is secured, by bearings 33, a long shaker 34. This shaker 34 consists of two side angle irons 35, a series of transversely positioned angle irons 36, and a plurality of rods 37 extending through the vertical flanges of the irons 36.

The shaft 27 is journaled in the upper ends of a pair of rear standards 38, bolted to the main frame 5, and a shaft 39 is journaled in the upper ends of a pair of front standards 40 also bolted to the frame, said front standards being higher than the rear standards. The shafts 27 and 39 are provided respectively with sprocket gears 41 and 42 which are connected by a chain 43. These shafts are also offset as at 44, in a similar fashion to the shafts 23 and 31. On each of the offset portions 44 is rotatably mounted a pair of bearings 45, in each of which is adjustably secured by a set screw 46 a hanger 47. On the lower ends of the hangers 47 is secured a shaker 48. The shaker 48 is similar in construction to the shaker 34 but is preferably inverted and is considerably shorter than the latter (see Fig. 3). The shaker 48 is further provided with guides 49 which are slidably engaged by the standards 38 and 40. Thus the shaker 48 moves up and down only, while the shaker 34 revolves on two centers, moving horizontally as well as up and down.

One end of the shaft 31 is provided with a bevel gear 50 which meshes with a bevel pinion 51 on a shaft 52 journaled on the frame 5. An elevator frame 53 pivots on the shaft 52, and is provided with two rollers 54 and 55 over which passes an endless conveyor 56. The shaft 57 of the roller 54 is provided with a sprocket chain 58 which is driven by a chain 59 passing also over a sprocket gear 60 fixed on the shaft 52. The inclination of the elevator is determined and adjusted by suitable slotted straps such as 61 (see Fig. 2). Two holders 62 are secured in the frame 5 and in them are vertically slidable a pair of racks 63, the latter being connected at their lower ends by a cross bar 64. To the underside of the cross bar 64 is fixed a plow beam 65 carrying a plow 66. The racks 63 are engaged by pinions 67 on a shaft 68 having a hand wheel 69, so that by regulating the latter the plow can be adjusted to any vertical position or depth desired.

When the machine is hitched to a tractor or to horses, and is being drawn forward, the plow 66 will plow up the dirt and turn it over onto the carrier 56, which will carry the dirt and weeds up and drop them on the shaker 34. The movement of the shaker will cause the load to be thrown upward and backward, and every time the dirt is thrown up the upper shaker 48 comes down and further pulverizes it. The dirt as it disintegrates and pulverizes falls through the shaker 34 back onto the ground, but the quack grass and weeds, as they travel rearward eventually fall into a basket 70 secured on the rear end of the frame, and from here they may be removed as often as a sufficient amount has accumulated.

It is understood that various and suitable modifications may be made in the form and structure of this invention if such modifications come within the spirit and scope of the appended claims.

Having now therefore fully shown and described my invention, what I claim to be new and desire to protect by United States Letters Patent is:

1. A machine of the class described consisting of a wheel supported frame adapted to be drawn, an inclined elevator mounted transversely in the front end of the frame, a plow adapted to turn dirt over onto the lower end of the elevator, a lower shaker positioned longitudinally of the machine, the same having its forward end under the upper end of the elevator and being inclined rearwardly, an upper shaker positioned over the greater part of the lower shaker, said upper shaker being adapted to reciprocate vertically, and means for simultaneously actuating said elevator and shakers.

2. A machine of the class described consisting of a wheel supported frame adapted to be drawn, an inclined elevator mounted transversely in the front end of the frame, a plow adapted to turn dirt over onto the lower end of the elevator, a lower shaker positioned longitudinally of the machine, the same having its forward end under the upper end of the elevator and being inclined rearwardly, a basket at the rear end of said lower shaker, an upper shaker positioned over the greater part of the lower shaker, said upper shaker being adapted to reciprocate vertically, and means for simultaneously actuating said elevator and shakers.

3. A machine of the class described consisting of a wheel supported frame adapted to be drawn, an inclined elevator mounted transversely in the front end of the frame, a plow adapted to turn dirt over onto the lower end of the elevator, said plow being secured to a pair of racks vertically slidable in the frame, a shaft, having a hand wheel, journaled near said racks, pinions on the shaft adapted to engage the racks, a lower shaker positioned longitudinally of the machine, the same having its forward end under the upper end of the elevator and being inclined rearwardly, an upper shaker positioned over the greater part of the lower shaker, said upper shaker being adapted to reciprocate vertically, and means for simultaneously actuating said elevator and shakers.

4. A machine of the class described consisting of a wheel supported frame adapted to be drawn, an inclined elevator mounted transversely in the front end of the frame, a plow adapted to turn dirt over onto the lower end of the elevator, a lower shaker positioned longitudinally of the machine, the same having its forward end under the upper end of the elevator and being inclined rearwardly, a pair of shafts journaled transversely in the frame, said shafts having offset portions adapted to carry and actuate said shaker, an upper shaker positioned over the greater part of the lower shaker, said upper shaker being adapted to reciprocate vertically, and means for simultaneously actuating said elevator and shaker.

5. A machine of the class described consisting of a wheel supported frame adapted to be drawn, an inclined elevator mounted transversely in the front end of the frame, a plow adapted to turn dirt over onto the lower end of the elevator, a lower shaker positioned longitudinally of the machine, the same having its forward end under the upper end of the elevator and being inclined rearwardly, an upper shaker positioned over the greater part of the lower shaker, standards secured to the frame for vertically guiding said upper shaker, and means for simultaneously actuating said elevator and shakers.

6. A machine of the class described consisting of a wheel supported frame adapted to be drawn, an inclined elevator mounted transversely in the front end of the frame, a plow adapted to turn dirt over onto the lower end of the elevator, a lower shaker positioned longitudinally of the machine, the same having its forward end under the upper end of the elevator and being inclined rearwardly, an upper shaker positioned over the greater part of the lower shaker, standards secured to the frame for vertically guiding said upper shaker, shafts journaled in the upper ends of said standards, said shafts having offset portions, operative connections between said offset portions and the upper shaker, and means for simultaneously actuating said elevator and shakers.

7. A machine of the class described consisting of a wheel supported frame adapted to be drawn, an inclined elevator mounted transversely in the front end of the frame, a plow adapted to turn dirt over onto the lower end of the elevator, a lower shaker positioned longitudinally of the machine, the same having its forward end under the upper end of the elevator and being inclined rearwardly, an upper shaker positioned over the greater part of the lower shaker, standards secured to the frame for vertically guiding said upper shaker, shafts journaled in the upper ends of said standards, said shafts having offset portions, operative connections between said offset shaft portions and the upper shaker, means for adjusting the lengths of said connections, and means for simultaneously actuating said elevator and shaker.

8. A machine of the class described consisting of a wheel supported frame adapted to be drawn, an inclined elevator mounted transversely in the front end of the frame, a plow adapted to turn dirt over onto the lower end of the elevator, a lower shaker positioned longitudinally of the machine, the same having its forward end under the upper end of the elevator and being inclined rearwardly, an upper shaker positioned over the greater part of the lower shaker said upper shaker being adapted to reciprocate vertically, said shakers consisting of side members, transverse angle irons secured thereto and longitudinal bars extending through the vertical flanges of said angle irons, and means for simultaneously actuating said elevator and shakers.

In testimony whereof I affix my signature.

ROBERT LUCY.